United States Patent
Arai et al.

(10) Patent No.: US 6,474,949 B1
(45) Date of Patent: Nov. 5, 2002

(54) EVACUATING UNIT WITH REDUCED DIAMETER EXHAUST DUCT

(75) Inventors: Satoshi Arai, Tokyo (JP); Katsuaki Usui, Tokyo (JP); Takahiro Isozaki, Tokyo (JP)

(73) Assignee: Ebara Corporation, Tokyo (JP)

(*) Notice: Subject to any disclaimer, the term of this patent is extended or adjusted under 35 U.S.C. 154(b) by 0 days.

(21) Appl. No.: 09/700,748

(22) PCT Filed: May 20, 1999

(86) PCT No.: PCT/JP99/02645
§ 371 (c)(1),
(2), (4) Date: Nov. 20, 2000

(87) PCT Pub. No.: WO99/60272
PCT Pub. Date: Nov. 25, 1999

(30) Foreign Application Priority Data

May 20, 1998 (JP) .............................. 10-155381
Sep. 16, 1998 (JP) .............................. 10-261715

(51) Int. Cl.⁷ .......................... F04B 41/06; F04B 49/06
(52) U.S. Cl. ..................... 417/2; 417/44.2; 417/43; 417/53
(58) Field of Search ................... 417/2, 44.2, 43, 417/53

(56) References Cited

U.S. PATENT DOCUMENTS

| | | | | |
|---|---|---|---|---|
| 4,770,609 A | * | 9/1988 | Uchida et al. | 417/2 |
| 5,224,836 A | * | 7/1993 | Gunn et al. | 417/14 |
| 5,641,270 A | * | 6/1997 | Sgourakes et al. | 417/44.2 |
| 5,664,937 A | * | 9/1997 | Takahashi et al. | 417/22 |
| 5,725,358 A | * | 3/1998 | Bert et al. | 417/44.2 |

FOREIGN PATENT DOCUMENTS

| | | |
|---|---|---|
| JP | 1-106980 | 4/1989 |
| JP | 2-42186 | 2/1990 |
| JP | 3-152350 | 6/1991 |
| JP | 5-195984 | 8/1993 |
| JP | 6-311778 | 11/1994 |
| JP | 8-319946 | 12/1996 |
| JP | 09-221381 | 8/1997 |
| JP | 9-317641 | 12/1997 |

OTHER PUBLICATIONS

"Next Generation for 300mm LSI Plant," 13th Nikkei Microdevices LSI Seminar, (Partial English Translation) (Feb. 19, 1998), pp. 86–86.
Kawasaki, H., et al., "Vacuum Exhaust System," U.S. patent application Ser. No. 09/671,745 (filed: Sep. 29, 2000), pp. 1–32.

* cited by examiner

Primary Examiner—Charles G. Freay
Assistant Examiner—Timothy P. Solak
(74) Attorney, Agent, or Firm—Armstrong, Westerman & Hattori, LLP

(57) ABSTRACT

An apparatus for and a method of evacuating a vacuum chamber (process chamber) or the like of a semiconductor fabrication facility, for example. The evacuating apparatus has a vacuum chamber to be evacuated, a discharge pipe connecting the vacuum chamber to an atmospheric port, a vacuum pump connected to the discharge pipe and operable at a variable rotational speed, and a controller for controlling the rotational speed of the vacuum pump.

15 Claims, 7 Drawing Sheets

F I G. 5
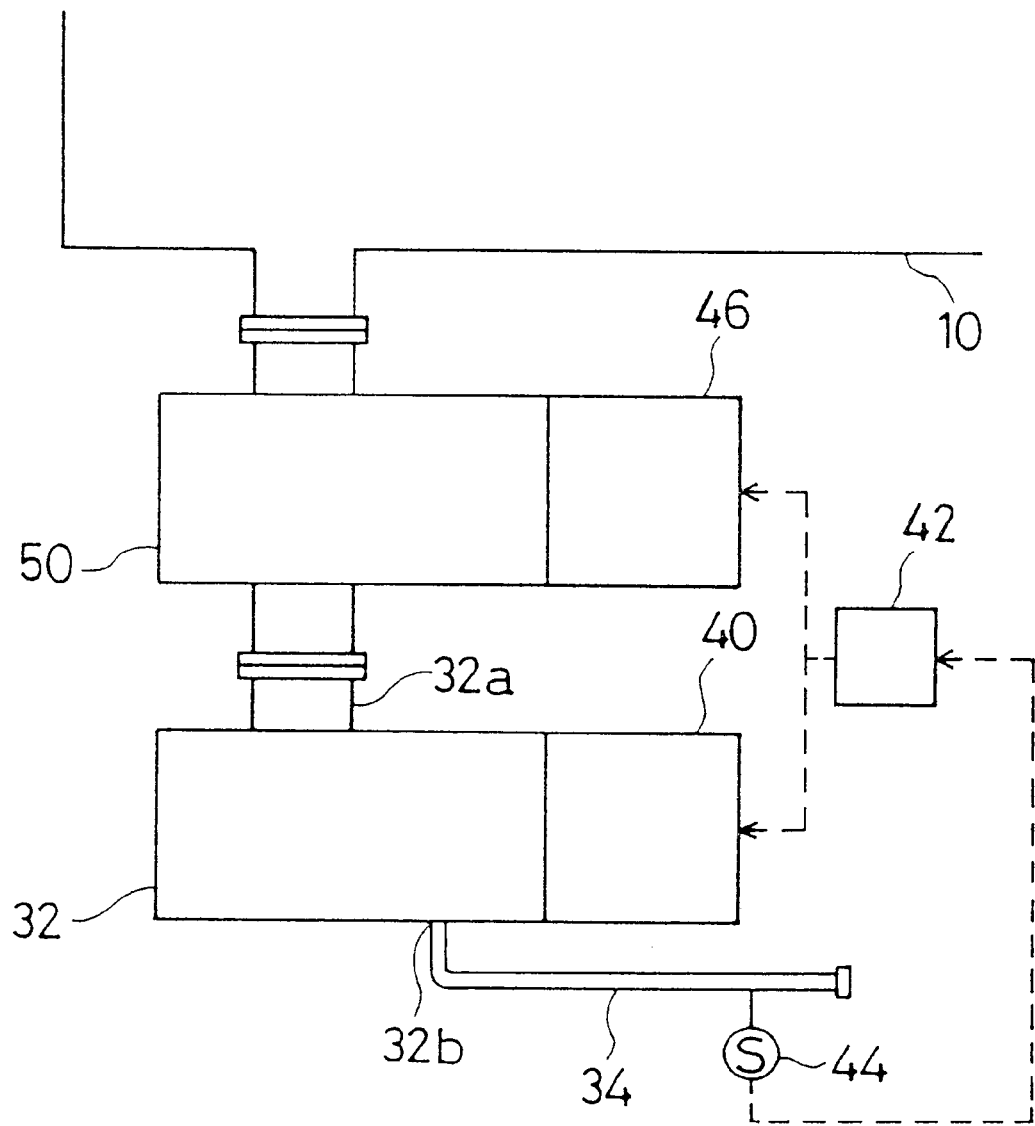

EVACUATING UNIT WITH REDUCED DIAMETER EXHAUST DUCT

FILED OF THE INVENTION

The present invention relates to an apparatus for and a method of evacuating a vacuum chamber (process chamber) of, for example, a semiconductor fabrication facility or the like.

DESCRIPTION OF THE RELATED ART

FIG. 7 of the accompanying drawings shows an evacuating path for evacuating a vacuum chamber 10, which is used in an etching apparatus, a chemical vapor deposition apparatus (CVD), or the like for a semiconductor fabrication process. To the vacuum chamber 10, there is connected an inlet port 14a of a vacuum pump 14 of an evacuating system 12. The vacuum pump 14 has an outlet port 14b connected to a discharge pipe 16. The vacuum pump 14 increases the pressure of a process gas discharged from the vacuum chamber 10 to the atmospheric pressure. The vacuum pump 14 has conventionally been in the form of an oil rotary pump, but primarily comprises a dry pump at present.

If the vacuum level required by the vacuum chamber 10 is higher than the vacuum level that can be acquired by the vacuum pump 14, then an ultrahigh vacuum pump such as a turbo-molecular pump or the like may be positioned upstream of the vacuum pump. If the process gas is of a type that cannot be discharged directly into the atmosphere, then a discharge gas processing facility is connected to the discharge pipe 16.

Heretofore, it has generally been customary to use an induction motor rotatable at a rated rotational speed as a motor 20 of the vacuum pump 14 of the evacuating system 12. In order to allow a large amount of gas to evacuate smoothly when the pump is started or when the atmosphere air is introduced in the chamber, and also to keep the back pressure on the vacuum pump 14 in an allowable range, the discharge pipe 16 has had an inside diameter of about 40 mm if the process gas is discharged at a rate of about 2000 L/min, for example.

Usually, the vacuum chamber of the semiconductor fabrication facility is placed in a clean room, and hence the discharge pipe is occasionally laid over a long distance in the clean room up to the external space. If the discharge pipe is large in diameter, then it will take up a costly space and have its layout limited due to interference with outer component devices of the semiconductor fabrication facility. If the discharge pipe is small in diameter, then it cases an undue increase in the back pressure on the vacuum pump at the time a large amount of gas flows when the pump is started or the atmosphere air is introduced, with the result that the vacuum pump tends to fail to operate due to an excessive load. Therefore, there is a certain limitation to reducing the diameter of the discharge pipe.

DISCLOSURE OF INVENTION

The present invention has been made in view of the above drawbacks. It is an object of the present invention to provide an apparatus for and a method of evacuating a vacuum chamber with an evacuating system which includes a discharge pipe having a reduced diameter for space saving, and which operates stably by avoiding overloaded operation.

According to the present invention, an apparatus for evacuating a vacuum chamber through a discharge pipe with a vacuum pump having a variable rotational speed comprises a controller for controlling the rotational speed of the vacuum pump to keep a back pressure on the vacuum pump in a predetermined target range, and a discharge pipe connecting an outlet port of the vacuum pump to the atmospheric port and having a diameter corresponding to a specific flow capability, the diameter being less than a predetermined diameter corresponding to an evacuating flow capability of the vacuum pump.

According to the present invention, the apparatus further comprises a back pressure sensor connected to a discharge port of the vacuum pump, for; detecting a back pressure on the vacuum pump, wherein the controller controls the rotational speed of the vacuum pump based on a detected output from the back pressure sensor. Therefore, the back pressure can be controlled accurately at all times to operate the evacuating apparatus stably.

According to the present invention the controller controls the rotational speed of the vacuum pump to keep the detected output from the back pressure sensor in a predetermined target range.

According to the present invention the controller controls the rotational speed of the vacuum pump to prevent the detected output of the back pressure sensor from exceeding a predetermined target value.

According to the present invention the apparatus further comprises a booster pump connected to the discharge pipe in series with the vacuum pump, wherein the controller controls to start the booster pump when the detected output from the back pressure sensor results in insufficient evacuating capability for the vacuum pump. Therefore, the evacuating apparatus is thus capable of handling a large evacuating load while saving energy.

According to the present invention the controller controls the rotational speed of the vacuum pump according to a previously inputted pattern of changes in the rotational speed. The back pressure can thus be controlled with a simple apparatus arrangement, and the evacuating apparatus can start up stably.

According to the present invention the discharge pipe has a flow capability less than the evacuating capability of the vacuum pump. Therefore, the space required for piping is reduced, and the space in an expensive clean room can be effectively utilized. The pipe and the apparatus are easily joined to each other.

According to the present invention, there is provided a method of evacuating a vacuum chamber through a discharge pipe with a vacuum pump having a variable rotational speed, which comprises the steps of connecting a discharge pipe from an outlet port of the vacuum pump to the atmospheric port, the discharge pipe having a flow capability smaller than an evacuating flow capability of said vacuum pump, and detecting a back pressure on the vacuum pump and controlling the rotational speed of the vacuum pump based on the detected back pressure to keep the back pressure in a predetermined target range.

According to the present invention a booster pump is connected to the discharge pipe in series with the vacuum pump, and the method further comprises the step of starting the booster pump when the detected back pressure on the vacuum pump results in insufficient evacuating capability for the vacuum pump.

According to the present invention, the method further comprises the step of controlling the rotational speed of the vacuum pump according to a previously inputted pattern of changes in the rotational speed in an initial period of evacuating the vacuum pump.

According to the present invention, there is provided a method of evacuating a vacuum chamber through a discharge pipe with a vacuum pump having a variable rotational speed, which comprises the step of controlling the rotational speed of the vacuum pump according to a previously inputted pattern of changes in the rotational speed in an initial period of evacuating the vacuum pump.

According to the present invention, the rotational speed increases at a rate selected to keep an initial peak of the back pressure in evacuating the vacuum chamber, equal to or below a predetermined value.

According to the present invention, the rotational speed increases stepwise.

BRIEF DESCRIPTION OF THE DRAWINGS

FIG. 5 is a view showing an evacuating apparatus according to another embodiment of the present invention;

DETAILED DESCRIPTION OF THE PREFERRED EMBODIMENTS

Figure 1:
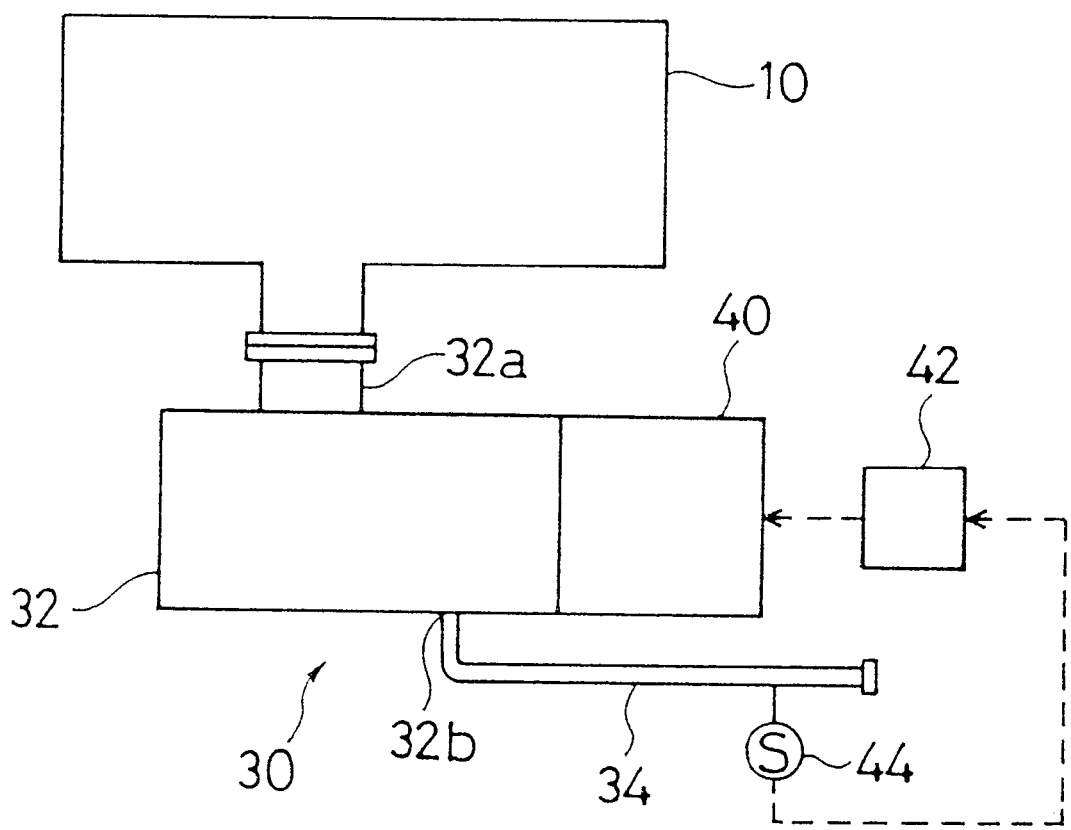
FIG. 1 is a view showing an evacuating apparatus according to an embodiment of the present invention.

Embodiments of the present invention will be described below with reference to the drawings. FIG. 1 shows an evacuating system 30 for evacuating a vacuum chamber 10, which is used in an etching apparatus, a chemical vapor deposition apparatus (CVD), or the like for a semiconductor fabrication process performed thereby. The vacuum chamber 10 is connected to an inlet port 32a of a vacuum pump 32, which has an outlet port 32b connected to a discharge pipe 34.

Figure 7:
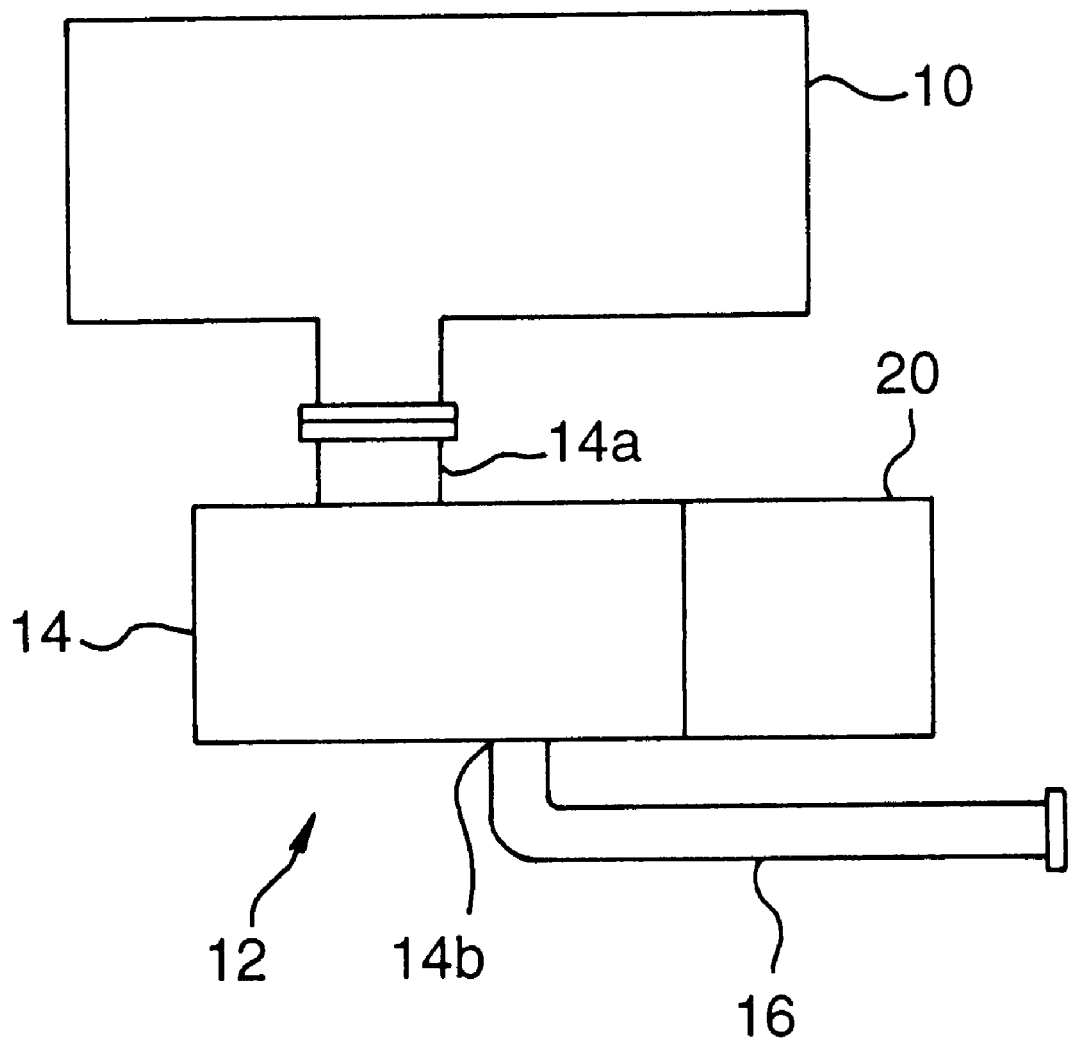
FIG. 7 is a view showing a conventional evacuating apparatus.

The vacuum pump 32 comprises a so-called dry pump which does not use a lubricant in a gas passage. The vacuum pump 32 is operated by a motor 40 comprising a DC motor, particularly, a brushless DC motor, having a rotational speed controller 42 which employs an inverter (frequency converting circuit), for example. The discharge pipe 34 has a diameter less than the diameter of the conventional discharge pipe 16 shown in FIG. 7. For example, if the gas is discharged at a rate of about 2000 L (liter)/min., then the discharge pipe 34 has an inside diameter of about 10 mm. The inside diameter of the discharge pipe 34 is determined such that the flow capability is of a certain value, in view of the length of the discharge pipe 34.

A back pressure sensor 44 for detecting the pressure in the discharge pipe 34, i.e., the back pressure on the vacuum pump 32, is disposed near the outlet port of the discharge pipe 34. An output signal from the back pressure sensor 44 is applied to the rotational speed controller 42 of the motor 40.

Figure 2:
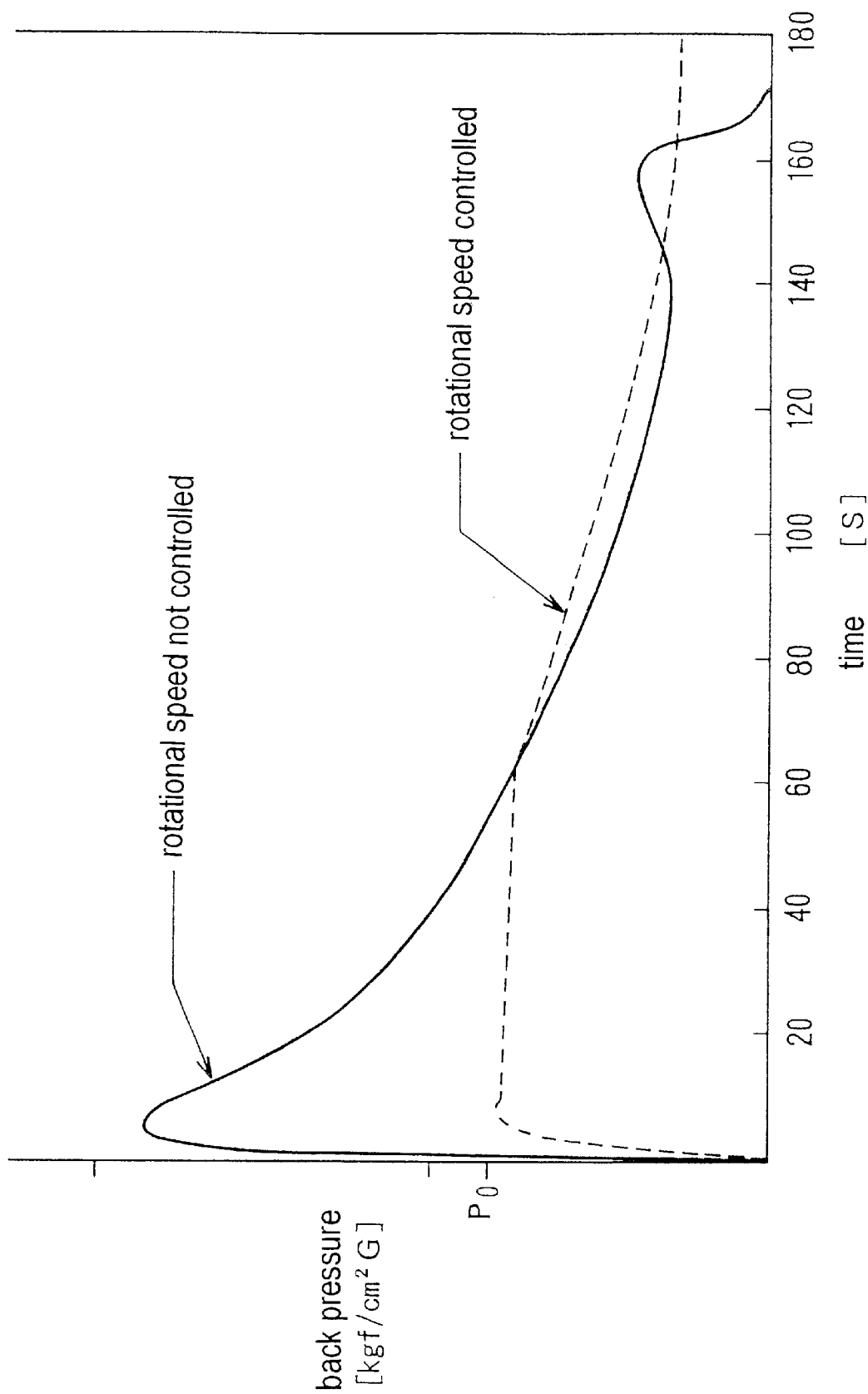
FIG. 2 is a graph showing how the rotational speed of a vacuum pump varies with time in a method of operating the vacuum pump according to a first embodiment of the present invention, in comparison with a conventional example.

A method of operating the vacuum pump 32 for starting the vacuum pump 32 will be described below with reference to FIG. 2. In this embodiment, the rotational speed of the vacuum pump 32 is controlled to keep the back pressure on the vacuum pump 32 at a predetermined value $P_0$. Specifically, when the detected back pressure of the vacuum pump 32 reaches $P_0+\alpha$, the rotational speed controller 42 lowers the rotational speed of the motor 40, and when the detected back pressure of the vacuum pump 32 becomes less than $P_0-\alpha$, the rotational speed controller 42 raises the rotational speed of the motor 40. As a result, as indicated by the broken-line curve in FIG. 2, the back pressure is kept substantially at the predetermined value $P_0$, allowing the vacuum pump 32 to operate stably through a prolonged time period. After elapse of a predetermined time, the back pressure drops below the predetermined value $P_0$, and the vacuum pump 32 enters a steady mode of operation.

Figure 3:
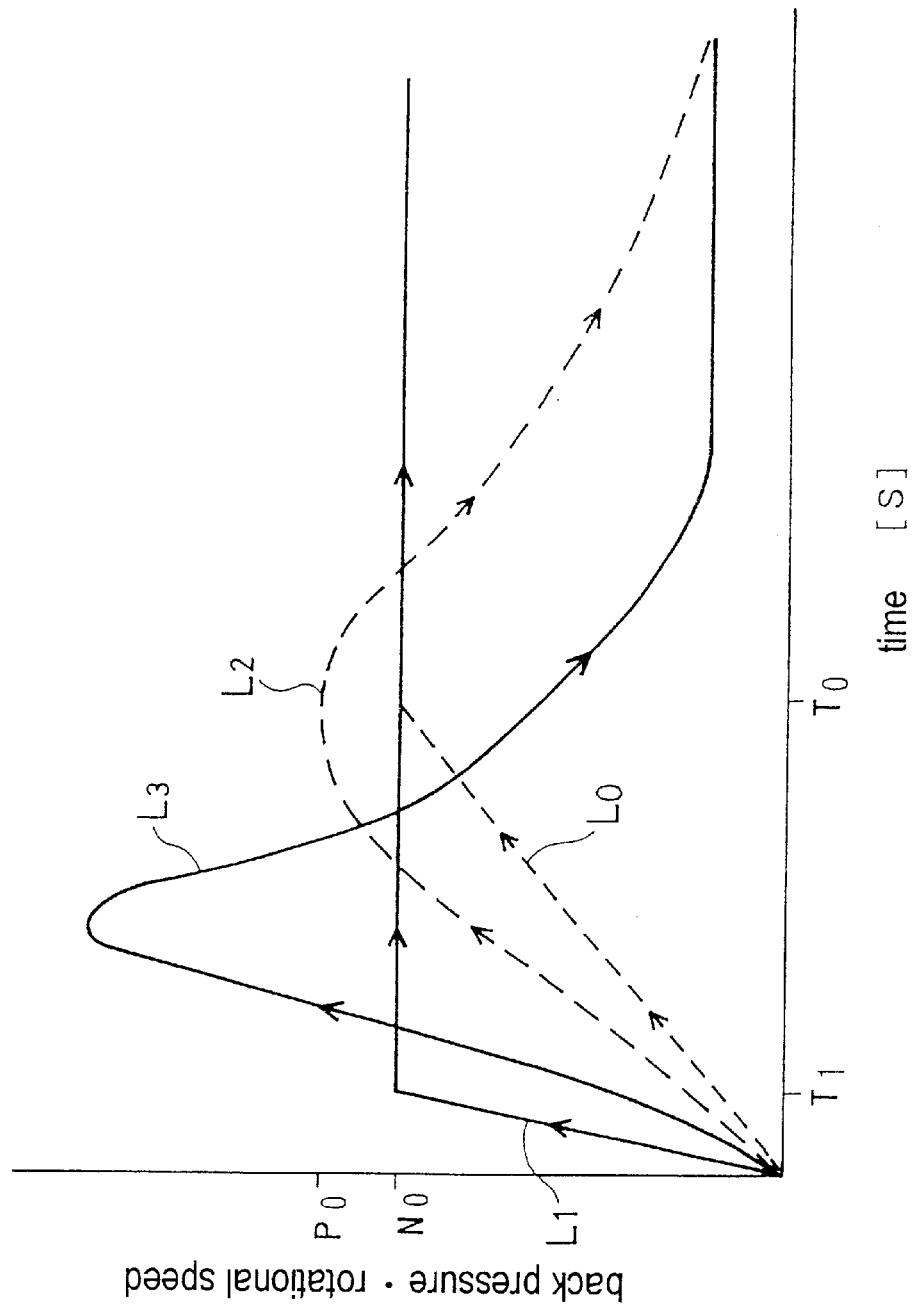
FIG. 3 is a graph showing how the rotational speed and back pressure of a vacuum pump varies with time in a method of operating the vacuum pump according to a second embodiment of the present invention, in comparison with a conventional example.

In the above embodiment, the vacuum pump 32 is controlled in a feedback loop using the back pressure sensor 44. Another embodiment which performs a simpler sequence control mode will be described below with reference to FIG. 3. In this embodiment, the stationary installation of the back pressure sensor 44 is not required. A time-dependent change in the rotational speed of the vacuum pump 32 at the time it is started is inputted in advance to the rotational speed controller 42. In FIG. 3, such a time-dependent change is represented by a broken-line curve $L_0$ of a constant low gradient which reaches a steady rotational speed $N_0$ in a longer time $T_0$ than a time $T_1$ with the conventional pump. After the time $T_0$, the vacuum pump 32 keeps the steady rotational speed $N_0$.

In FIG. 3, a change in the back pressure on the vacuum pump 32 is represented by a broken-line curve $L_2$. The change in the back pressure represented by the broken-line curve $L_2$ has an initial peak value $P_0$ less than the peak value of the conventional back pressure whose change is represented by a curve $L_3$ when the rotational speed changes according to a solid-line curve $L_1$. The gradient $N_0/T_0$ of the rotational speed change curve $L_0$ is determined experimentally or calculated from past experimental data depending on the capability of the vacuum pump 32, the volume of the vacuum chamber 10, an the flow capability of the discharge pipe 34, so that the vacuum pump 32 can achieve a given evacuating capability insofar as the peak value $P_0$ does not pose an excessive load on the motor which actuates the vacuum pump 32.

Figure 4:
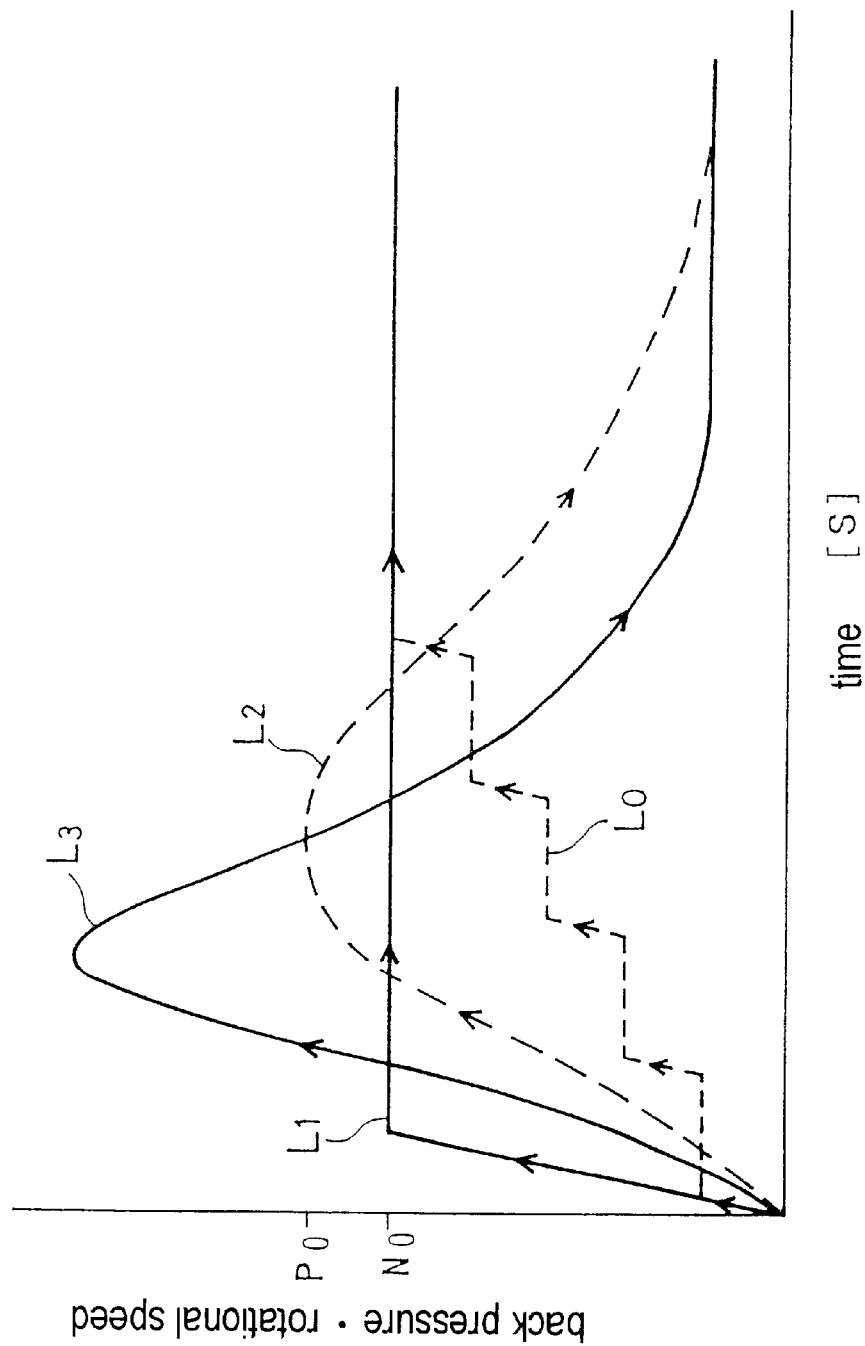
FIG. 4 is a graph showing how the rotational speed and back pressure of a vacuum pump varies with time in a method of operating the vacuum pump according to a third embodiment of the present invention, in comparison with a conventional example.

In this embodiment, because a complex control process such as the feedback control process based on the back pressure sensor is not carried out, no back pressure sensor is required, and the same advantages as those of the preceding embodiment can be achieved with a simpler arrangement. Gradient settings may be selected depending on changes in conditions such as the capability of the vacuum pump 32, the volume of the vacuum chamber 10, and the conductance of the discharged pipe 34. In the embodiment shown in FIG. 3, the rotational speed of the motor increases linearly. However, the rotational speed of the motor may increase stepwise as shown in FIG. 4.

FIG. 5 shows another embodiment of the present invention. In the embodiment shown in FIG. 5, a booster pump 50 is disposed upstream of the vacuum pump (main pump) 32 in the discharge path. The pumps 32, 50 are actuated by respective motors 40, 46, each of which comprises a brushless DC motor having a rotational speed controller 42 which employs an inverter. As with the previous embodiment, the discharge pipe 34 has a small diameter, and the back pressure sensor 44 is disposed near the outlet port of the discharge pipe 34 for the control of the rotational speed of the main pump based on the output of the back pressure sensor 44.

Figure 6:
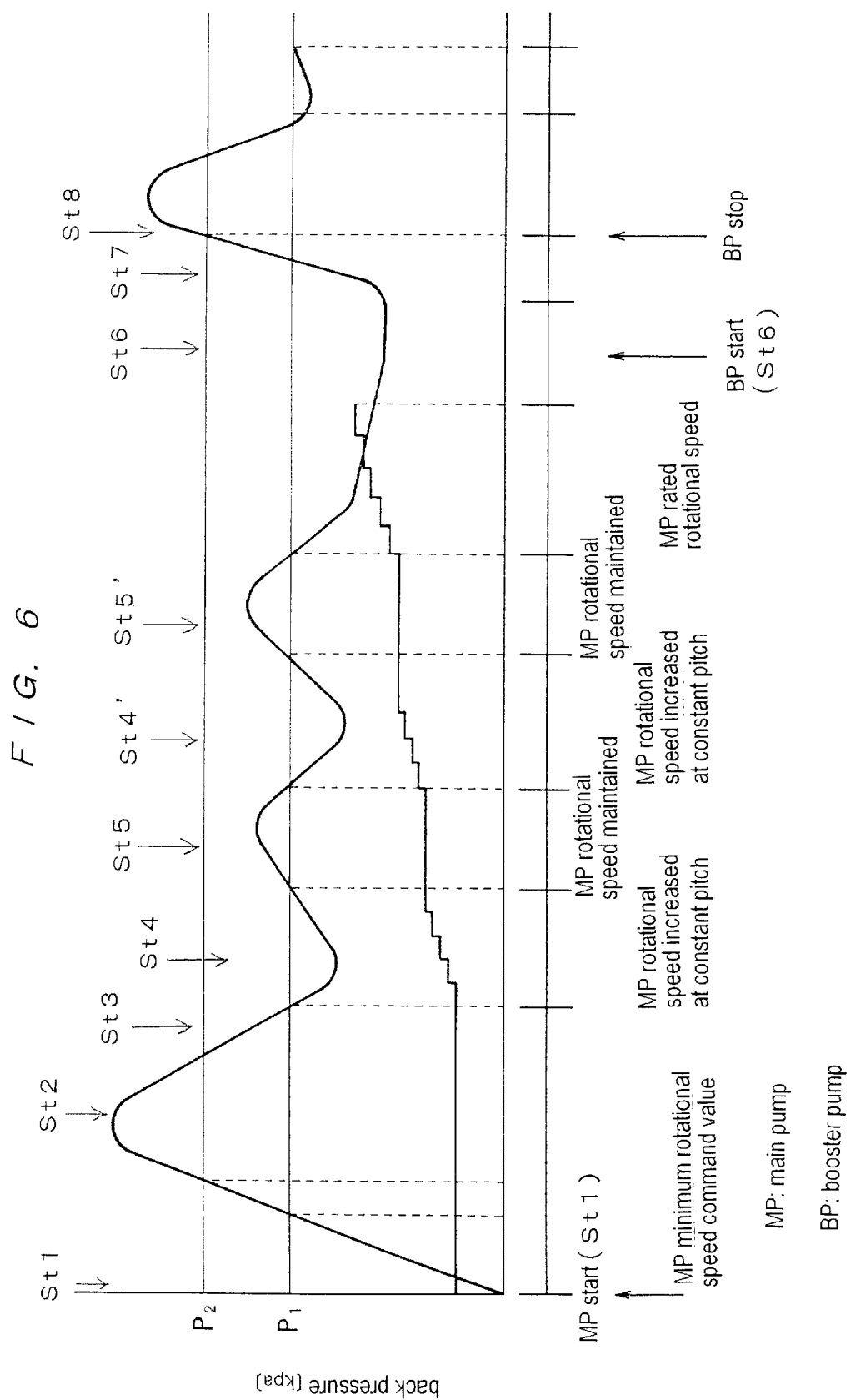
FIG. 6 is a graph showing how the rotational speed and back pressure of a vacuum pump varies with time in a method of operating the vacuum pump according to a fifth embodiment of the present invention.

A method of controlling the evacuating apparatus according to the embodiment shown in FIG. 5 will be described below with reference to FIG. 6. In this embodiment, a target range for the back pressure is kept between a lower limit $P_1$ and an upper limit $P_2$ in order to discharge the gas stably and not to apply an excessive load to the motors 40, 46.

When a discharge process is started, a large amount of gas is discharged, tending to increase the back pressure, as described above. Therefore, a command is applied to start only the main pump 32 at a minima rotational speed (step 1). The back pressure rises up to an initial peak value that is determined depending on the volume and initial pressure of the vacuum chamber 10, which is to be evacuated, and the evacuating capability at the minima rotational speed of the main pump 32 (step 2). Then, the back pressure begins to fall. The vacuum chamber 10 is evacuated at the minimum rotational speed of the main pump 32 until the back pressure descends to and below the lower limit $P_1$ (step 3).

When the back pressure falls to and below the lower limit $P_1$, the rotational speed of the main pump 32 is increased at a constant pitch (steps 4, 4'). When the back pressure rises beyond the lower limit $P_1$ and enters the target range, the main pump 32 is kept at the rotational speed that has been reached (steps: 5, 5'). In this manner, if the volume of the vacuum chamber 10 and the evacuating capability of the main pump 32 balance each other, the rotational speed of the main pump 32 is controlled to adjust the back pressure at around the lower limit $P_1$, so that the evacuating apparatus can continuously operate stably.

When the amount of gas produced by the vacuum chamber increases, the volume of the vacuum chamber 10 and the evacuating capability of the main pump 32 are brought out of balance with each other. At this time, even if a command is applied to increase the rotational speed of the main pump 32, the main pump 32 fails to keep up with the command, or the back pressure fails to increase. In this case, a timer or the like is used to detect how long the back pressure is continuously equal to or less than the lower limit $P_1$, and a command is, given to start the booster pump 50 at a rated rotational speed (step 6). In this manner, if the evacuating load on the vacuum chamber 10 is relatively large in balance with the sum of the evacuating capabilities of the main pump 32 and the booster pump 50, then the evacuating apparatus can continuously operate stably (step 7).

If the back pressure increases beyond the upper limit $P_2$ when the main pump 32 and the booster pump 50 are operated at their rated rotational speeds, then the booster pump 50 is shut down, and only the main pump 32 is operated (step 8). Therefore, the booster pump 50 is turned on or off depending on the back pressure.

In the above embodiment, the booster pump 50 may be of the variable speed type and may be controlled in the same fashion as with the main pump 32 in the preceding embodiment to adjust the back pressure at around the lower limit $P_1$. Alternatively, the booster pump 50 may be operated at the rated rotational speed, whereas the rotational speed of the main pump 32 may be controlled. If the main pump 32 has a lower minimum rated rotational speed, then the initial stage control process illustrated in FIG. 2 or 4 may be performed for the main pump 32.

In this embodiment, if the piping system suffers leakage for some reason, then the main pump 32 and the booster pump 50 may be prevented from being simultaneously operated to avoid a meaningless continuous evacuating operation. Because the back pressure on the pump does not exceed a predetermined value, the temperature of the pump is prevented from unduly increasing due to an excessive increase in the back pressure, so that the pump can operate stably.

For the same reasons, it is not necessary to provide a jacket for passing a cooling medium such as water around the pump casing to directly cool the pump casing, but a partial cooling system in the form of a conventional manifold cooler may be employed. Because no direct cooling system is employed, the temperature in the pump is not excessively lowered. Therefore, the evacuating apparatus is applicable to a process where reaction produces are likely to occur.

According to the present invention, as described above, even when a large amount of gas is discharged at the time the vacuum pump is started, the back pressure on the vacuum pump is controlled so as not to exceed a certain value. The booster pump may be added which is started only when the evacuating load is increased in the process of operating the evacuating apparatus. Thus, the evacuating apparatus can operate stably while saving energy. Even though the diameter of the discharge pipe is small, the evacuating apparatus can operate stably while avoiding overloaded operation. By using the discharge pipe whose diameter is smaller than required by the evacuating capability, it is possible to effectively utilize the space in an expensive clean room.

The present invention is useful as an apparatus for and a method of evacuating a vacuum chamber (process chamber) or the like of a processing apparatus such as an etching apparatus, a chemical vapor deposition apparatus (CVD), or the like that is used in a semiconductor fabrication process.

What is claimed is:

1. An apparatus for evacuating a vacuum chamber through a discharge pipe, comprising:

a vacuum pump having a variable rotational speed;

a controller for controlling the rotational speed of said vacuum pump to keep a back pressure on the vacuum pump in a predetermined target range; and a discharge pipe competing an outlet port of the vacuum pump to an atmospheric port and having a diameter corresponding to a specific flow capability in which said diameter is less than a predetermined diameter corresponding to an evacuating flow capability of the vacuum pump, wherein said predetermined target range is determined depending on the evacuating flow capability of the vacuum pump and a conductance of the discharge pipe.

2. An apparatus according to claim 1, further comprising:

a discharge port on said vacuum pump; and a back pressure sensor connected to said discharge port for detecting a back pressure on the vacuum pump, wherein said controller controls the rotational speed of said vacuum pump based on a detected output from said back pressure sensor.

3. An apparatus according to claim 1, wherein said controller controls the rotational speed of said vacuum pump so as to keep said back pressure less than a predetermined target range.

4. An apparatus according to claim 3, wherein a booster pump is further provided in series with said vacuum pump.

5. An apparatus according to claim 1, wherein said controller controls the rotational speed of said vacuum pump according to a previously inputted pattern so as to keep said back pressure in said predetermined target range.

6. An apparatus according to claim 5, wherein said previously inputted pattern comprises linearly increasing rotational speed of the vacuum pump with a gradient until a predetermined speed and then maintaining the predetermined speed.

7. An apparatus according to claim 6, wherein said gradient is determined depending on the evacuating flow capability of the vacuum pump and a conductance of the discharge pipe.

8. An apparatus according to claim 1, wherein a diameter of said discharge pipe is ¼ of a diameter corresponding to an evacuating flow capability.

9. A method of evacuating a vacuum chamber through a discharge pipe with a vacuum pump having a variable rotational speed, comprising:
connecting a discharge pipe from an outlet port of the vacuum pump to the atmospheric port, said discharge pipe having a flow capability less than an evacuating flow capability of said vacuum pump; and
controlling the rotational speed of said vacuum pump so as to keep the back pressure in a predetermined target range wherein said predetermined target range is determined depending on an evacuating flow capability of the vacuum pump and a conductance of the discharge pipe.

10. A method according to claim 9, further comprising:
detecting a back pressure of said vacuum pump by a pressure sensor; and
controlling said rotational speed of said vacuum pump based on detected back pressure thereby.

11. A method according to claim 10, wherein said controller controls the rotational speed of said vacuum pump according to a previously inputted pattern so as to keep said back pressure in said predetermined target range.

12. A method according to claim 11, further comprising:
increasing the rotational speed linearly with a gradient until a predetermined speed is reached; and
maintaining the predetermined speed according to said previously inputted pattern.

13. A method according to claim 12, wherein said gradient is determined depending on the evacuating flow capability of the vacuum pump and the conductance of the discharge pipe.

14. A method according to claim 9, wherein a booster pump is connected in series with said vacuum pump.

15. A method according to claim 9, wherein a diameter of said discharge pipe is ¼ of a diameter corresponding to an evacuating flow capability.

* * * * *

UNITED STATES PATENT AND TRADEMARK OFFICE
CERTIFICATE OF CORRECTION

PATENT NO. : 6,474,949 B1
DATED : November 5, 2002
INVENTOR(S) : Arai et al.

It is certified that error appears in the above-identified patent and that said Letters Patent is hereby corrected as shown below:

Title page,
Item [54], change "EVACUATING" to be -- EVACUATION --

Column 7,
Line 6, change "hack" to be -- back --

Signed and Sealed this

Fourth Day of March, 2003

JAMES E. ROGAN
*Director of the United States Patent and Trademark Office*